US012237139B2

(12) United States Patent
Zhang

(10) Patent No.: US 12,237,139 B2
(45) Date of Patent: Feb. 25, 2025

(54) FIELD EMISSION CATHODE DEVICE AND METHOD OF FORMING A FIELD EMISSION CATHODE DEVICE

(71) Applicant: NCX Corporation, Raleigh, NC (US)

(72) Inventor: Jian Zhang, Durham, NC (US)

(73) Assignee: NCX Corporation, Raleigh, NC (US)

(*) Notice: Subject to any disclaimer, the term of this patent is extended or adjusted under 35 U.S.C. 154(b) by 0 days.

(21) Appl. No.: 18/247,264

(22) PCT Filed: Sep. 29, 2021

(86) PCT No.: PCT/IB2021/058941
§ 371 (c)(1),
(2) Date: Mar. 29, 2023

(87) PCT Pub. No.: WO2022/070097
PCT Pub. Date: Apr. 7, 2022

(65) Prior Publication Data

US 2023/0411101 A1 Dec. 21, 2023

Related U.S. Application Data

(60) Provisional application No. 63/085,424, filed on Sep. 30, 2020.

(51) Int. Cl.

| | |
|---|---|
| ***H01J 3/02*** | (2006.01) |
| ***H01J 9/02*** | (2006.01) |
| ***H01J 9/14*** | (2006.01) |
| ***H01J 9/18*** | (2006.01) |

(52) U.S. Cl.
CPC .............. *H01J 3/021* (2013.01); *H01J 9/025* (2013.01); *H01J 9/148* (2013.01); *H01J 9/18* (2013.01)

(58) Field of Classification Search
CPC ............. H01J 3/021; H01J 9/025; H01J 9/148
See application file for complete search history.

(56) References Cited

U.S. PATENT DOCUMENTS

| | | | | |
|---|---|---|---|---|
| 5,319,279 A * | 6/1994 | Watanabe | ............... | H01J 3/022 313/309 |
| 2001/0024082 A1* | 9/2001 | Tomii | .................... | H01J 1/3044 313/446 |
| 2016/0148774 A1 | 5/2016 | Park et al. | | |

FOREIGN PATENT DOCUMENTS

| | | |
|---|---|---|
| CN | 104064432 A * | 9/2014 |
| KR | 101214431 | 12/2012 |
| KR | 20170089387 | 8/2017 |

* cited by examiner

*Primary Examiner* — Karabi Guharay
(74) *Attorney, Agent, or Firm* — Womble Bond Dickinson (US) LLP

(57) ABSTRACT

A field emission cathode device and method for forming a field emission cathode device involve a cathode element having a field emission surface, and a gate electrode element disposed in spaced-apart relation to the field emission surface of the cathode element so as to define a gap therebetween, with the gate electrode element having a plurality of parallel grill members or a mesh structure laterally-extending between opposing anchored ends. A film element laterally co-extends and is engaged with the gate electrode element, with the film element being arranged to allowed electrons emitted from the field emission surface of the cathode element to pass therethrough, and to cooperate with the gate electrode element and the cathode element to form a substantially uniform electric field within the gap and about the field emission surface.

25 Claims, 4 Drawing Sheets

FIELD EMISSION CATHODE DEVICE AND METHOD OF FORMING A FIELD EMISSION CATHODE DEVICE

CROSS-REFERENCE TO RELATED APPLICATIONS

This application is a national stage filing under 35 U.S.C. 371 of PCT/IB2021/058941, filed Sep. 29, 2021, which International Application was published by the International Bureau in English on Apr. 7, 2022, as WO 2022/070097, and application claims priority from U.S. application Ser. No. 63/085,424, filed on Sep. 30, 2020, which applications are hereby incorporated in their entirety by reference in this application.

BACKGROUND

Field of the Disclosure

The present application relates to field emission cathode devices and, more particularly, to a field emission cathode device and method for forming a field emission cathode device.

Description of Related Art

Figure 1:
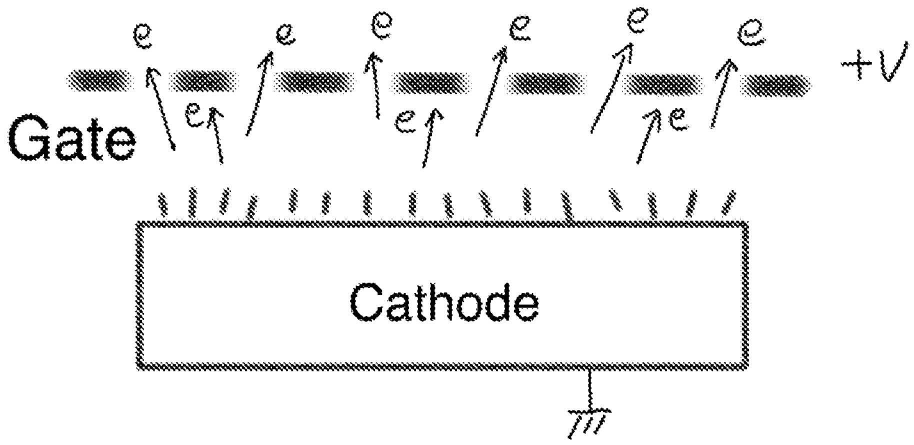
FIG. 1 Prior Art

A field emission cathode device/assembly generally includes a field emission cathode disposed in relation to an extraction gate structure (e.g., a gate electrode) so as to define a gap therebetween (see, e.g., the prior art shown in FIG. 1). An external gate voltage ($V_g$) is applied to the gate electrode, with the cathode being connected to ground, such that the generated electric field extracts field emission electrons from the cathode surface. Once the electrons are emitted from the cathode surface, some of the electrons will pass through the opening(s) of the gate electrode, while other electrons are absorbed by the gate electrode (e.g., some emitted electrons will bombard the gate electrode).

The gate electrode in the prior art can have different forms. In some instances, the gate electrode is configured to include multiple linear bars in a grill-like structure (see, e.g., FIG. 2A). In other instances, the gate electrode is configured as a mesh-like structure (see, e.g., FIG. 2B). Moreover, the gate electrode is generally comprised of a conductive material with a high melting temperature, such as, for example, tungsten, molybdenum, stainless steel, or doped silicon. The gate electrode, whether the grill structure or the mesh structure, generally defines a physical opening portion that ranges from about 50% to over 80% open area (e.g., the area portion of the gate electrode that is open space). The physical opening portion of the gate electrode is required in order to allow the emitted electrons from the cathode surface to pass through the gate electrode so as to form an electron beam. The percentage of electrons emitted from the cathode surface and passing through the gate electrode is called the electron transmission rate, wherein the higher the transmission rate, the higher usage efficiency of the generated and emitted electrons.

If the physical opening portion of the gate electrode is relatively low (see, e.g., FIG. 4—a dense mesh with less open area), more of the emitted electrons will be absorbed by the gate electrode, and the electron transmission rate decreases (sometimes significantly). However, if the physical opening portion of the gate electrode is relatively high (see, e.g., FIG. 3), the electric field within the gap and/or about the cathode surface becomes undesirably nonuniform. Since the emission of field emission electrons from the cathode surface is related to the characteristics of the triggering electric field, the nonuniform electric field, in turn, results in a nonuniform electron field emission from the cathode surface, which is not desirable.

Thus, there exists a need for a field emission cathode device, and a method of forming such a field emission cathode device, wherein the field emission cathode device is arranged to generate and exhibit a substantially uniform electric field at the cathode surface and within the gap between the gate electrode and the cathode. Such a substantially uniform electric field at the cathode surface of the field mission cathode device should also desirably increase the efficiency of field emission electron generation. The gate element should also desirably be structured to increase the gate transmission rate, and also reduce ion bombardment of the cathode surface.

SUMMARY OF THE DISCLOSURE

The above and other needs are met by aspects of the present disclosure which includes, without limitation, the following example embodiments and, in one particular aspect, provides a field emission cathode device, wherein such a device comprises a cathode element having a field emission surface, and a gate electrode element disposed in spaced-apart relation to the field emission surface of the cathode element so as to define a gap therebetween, with the gate electrode element having a plurality of parallel grill members or a mesh structure laterally-extending between opposing anchored ends. A film element laterally co-extends and is engaged with the gate electrode element, with the film element being arranged to allowed electrons emitted from the field emission surface of the cathode element to pass therethrough, and to cooperate with the gate electrode element and the cathode element to form a substantially uniform electric field within the gap and about the field emission surface.

Another example aspect provides a method of forming a field emission cathode device, wherein such a method comprises disposing a gate electrode element in spaced-apart relation to a field emission surface of a cathode element so as to define a gap therebetween, with the gate electrode element having a plurality of parallel grill members or a mesh structure laterally-extending between opposing anchored ends; and engaging a film element with the gate electrode element, the film element laterally co-extending with the gate electrode element and being arranged to allowed electrons emitted from the field emission surface of the cathode element to pass therethrough, and to cooperate with the gate electrode element and the cathode element to form a substantially uniform electric field within the gap and about the field emission surface.

The present disclosure thus includes, without limitation, the following example embodiments:

Example Embodiment 1: A field emission cathode device, comprising a cathode element having a field emission surface; a gate electrode element disposed in spaced-apart relation to the field emission surface of the cathode element so as to define a gap therebetween, the gate electrode element having a plurality of parallel grill members or a mesh structure laterally-extending between opposing anchored ends; and a film element laterally co-extending and engaged with the gate electrode element, the film element being arranged to allowed electrons emitted from the field emission surface of the cathode element to pass therethrough, and to cooperate with the gate electrode element and the cathode element to form a substantially uniform electric field within the gap and about the field emission surface.

Example Embodiment 2: The device of any preceding example embodiment, or combinations thereof, comprising a gate voltage source electrically connected to the gate electrode element, with the cathode element electrically connected to ground, and arranged to interact therebetween to generate the electric field within the gap for inducing the field emission surface to emit the electrons therefrom toward the gate electrode element.

Example Embodiment 3: The device of any preceding example embodiment, or combinations thereof, wherein the plurality of parallel grill members or the mesh structure of the gate electrode element has an open area of at least about 75%.

Example Embodiment 4: The device of any preceding example embodiment, or combinations thereof, wherein the film element is comprised of a metal, conductive silicon nitride, or carbon.

Example Embodiment 5: The device of any preceding example embodiment, or combinations thereof, wherein the metal comprises beryllium, aluminum, gold, or combinations thereof.

Example Embodiment 6: The device of any preceding example embodiment, or combinations thereof, wherein the film element is a thin film having a thickness of less than about 50 nm.

Example Embodiment 7: The device of any preceding example embodiment, or combinations thereof, wherein the gate electrode element is comprised of a conductive material having a high melting temperature.

Example Embodiment 8: The device of any preceding example embodiment, or combinations thereof, wherein the gate electrode element is comprised of tungsten, molybdenum, stainless steel, doped silicon, or combinations thereof.

Example Embodiment 9: The device of any preceding example embodiment, or combinations thereof, wherein the film element defines one or more openings in the open area of the plurality of parallel grill members or the mesh structure of the gate electrode element.

Example Embodiment 10: The device of any preceding example embodiment, or combinations thereof, wherein the film element is comprised of a conductive material having a high melting temperature, and wherein the film element is arranged to directly engage the gate electrode element.

Example Embodiment 11: The device of any preceding example embodiment, or combinations thereof, wherein the film element is comprised of a conductive material having a low melting temperature, and wherein the film element and the gate electrode element are arranged to include an insulator element disposed therebetween to thermally insulate the film element from the gate electrode element.

Example Embodiment 12: The device of any preceding example embodiment, or combinations thereof, wherein the insulator element is arranged to electrically insulate the film element from the gate electrode element.

Example Embodiment 13: The device of any preceding example embodiment, or combinations thereof, comprising a film voltage source electrically connected to the film element, with the cathode element electrically connected to ground, and arranged to interact with the gate electrode element and the cathode element to generate the electric field within the gap.

Example Embodiment 14: A method of forming a field emission cathode device, comprising disposing a gate electrode element in spaced-apart relation to a field emission surface of a cathode element so as to define a gap therebetween, the gate electrode element having a plurality of parallel grill members or a mesh structure laterally-extending between opposing anchored ends; and engaging a film element with the gate electrode element, the film element laterally co-extending with the gate electrode element and being arranged to allowed electrons emitted from the field emission surface of the cathode element to pass therethrough, and to cooperate with the gate electrode element and the cathode element to form a substantially uniform electric field within the gap and about the field emission surface.

Example Embodiment 15: The method of any preceding example embodiment, or combinations thereof, comprising electrically connecting a gate voltage source to the gate electrode element, with the cathode element electrically connected to ground, such that the gate voltage source is arranged to interact between the gate electrode element and the cathode element to generate the electric field within the gap for inducing the field emission surface to emit the electrons therefrom toward the gate electrode element.

Example Embodiment 16: The method of any preceding example embodiment, or combinations thereof, wherein disposing the gate electrode element in spaced-apart relation to the field emission surface comprises disposing the gate electrode element, arranged such that the plurality of parallel grill members or the mesh structure of the gate electrode element has an open area of at least about 75%, in spaced-apart relation to the field emission surface.

Example Embodiment 17: The method of any preceding example embodiment, or combinations thereof, wherein engaging the film element with the gate electrode element comprises engaging the film element, comprised of a metal, conductive silicon nitride, or carbon, with the gate electrode element.

Example Embodiment 18: The method of any preceding example embodiment, or combinations thereof, wherein engaging the film element with the gate electrode element comprises engaging the metal film element, comprised of beryllium, aluminum, gold, or combinations thereof, with the gate electrode element.

Example Embodiment 19: The method of any preceding example embodiment, or combinations thereof, wherein engaging the film element with the gate electrode element comprises engaging the film element, comprising a thin film having a thickness of less than about 50 nm, with the gate electrode element.

Example Embodiment 20: The method of any preceding example embodiment, or combinations thereof, wherein disposing the gate electrode element in spaced-apart relation to the field emission surface comprises disposing the gate electrode element, comprised of a conductive material having a high melting temperature, in spaced-apart relation to the field emission surface.

Example Embodiment 21: The method of any preceding example embodiment, or combinations thereof, wherein disposing the gate electrode element in spaced-apart relation to the field emission surface comprises disposing the gate electrode element, comprised of tungsten, molybdenum, stainless steel, doped silicon, or combinations thereof, in spaced-apart relation to the field emission surface.

Example Embodiment 22: The method of any preceding example embodiment, or combinations thereof, wherein engaging the film element with the gate electrode element comprises engaging the film element, defining one or more openings in the open area of the plurality of parallel grill members or the mesh structure of the gate electrode element, with the gate electrode element.

Example Embodiment 23: The method of any preceding example embodiment, or combinations thereof, wherein engaging the film element with the gate electrode element comprises directly engaging the film element, comprised of a conductive material having a high melting temperature, with the gate electrode element.

Example Embodiment 24: The method of any preceding example embodiment, or combinations thereof, wherein engaging the film element with the gate electrode element comprises engaging the film element, comprised of a conductive material having a low melting temperature, with the gate electrode element.

Example Embodiment 25: The method of any preceding example embodiment, or combinations thereof, comprising disposing an insulator element between the film element and the gate electrode element to thermally insulate the film element from the gate electrode element.

Example Embodiment 26: The method of any preceding example embodiment, or combinations thereof, wherein disposing the insulator element between the film element and the gate electrode element comprises disposing the insulator element, arranged to electrically insulate the film element from the gate electrode element, between the film element and the gate electrode element.

Example Embodiment 27: The method of any preceding example embodiment, or combinations thereof, comprising electrically connecting a film voltage source to the film element, with the cathode element electrically connected to ground, such that the film voltage source is arranged to interact with the gate electrode element and the cathode element to generate the electric field within the gap.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2A:
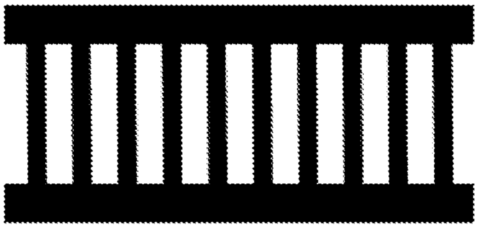
FIG. 2A Prior Art
Figure 2B:
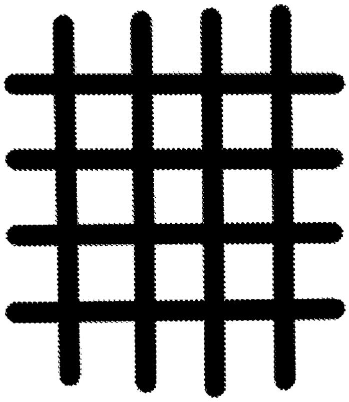
FIG. 2B Prior Art
Figure 3:
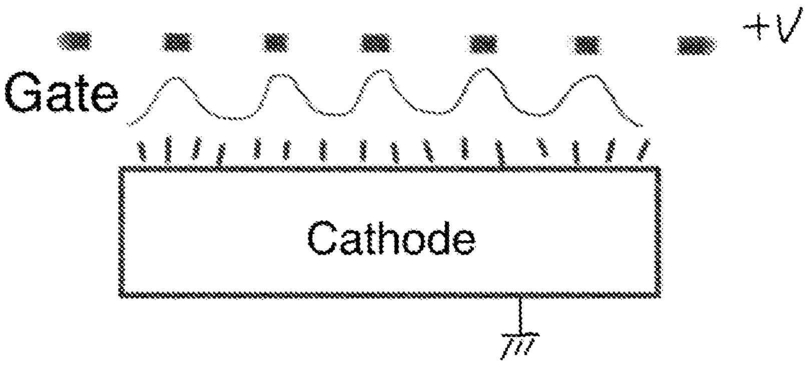
FIG. 3 Prior Art
Figure 4:
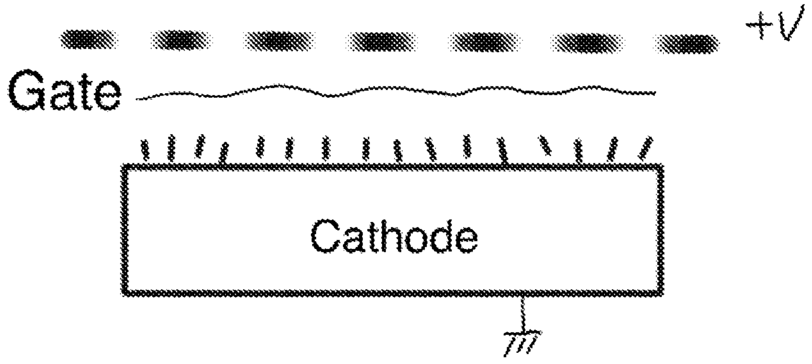
FIG. 4 Prior Art
Figures 5A, 5B:
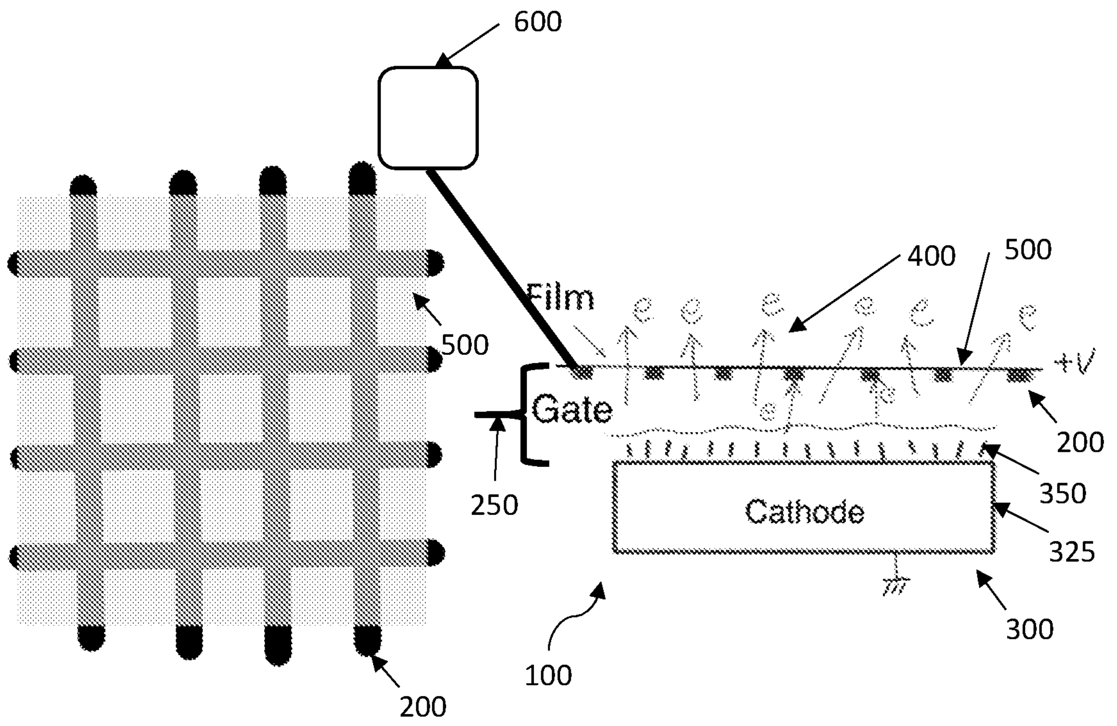
Figure 6A:
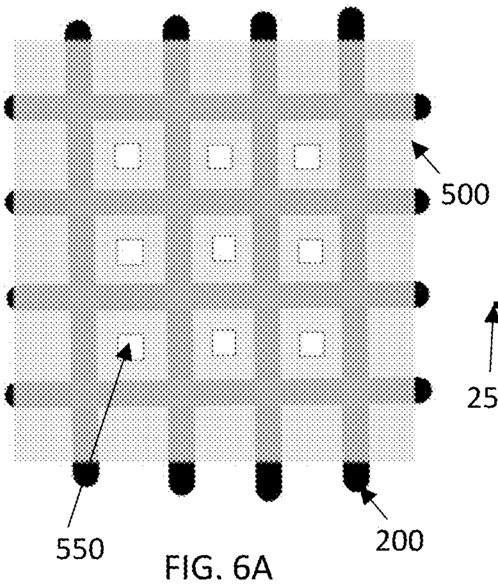
Figure 6B:
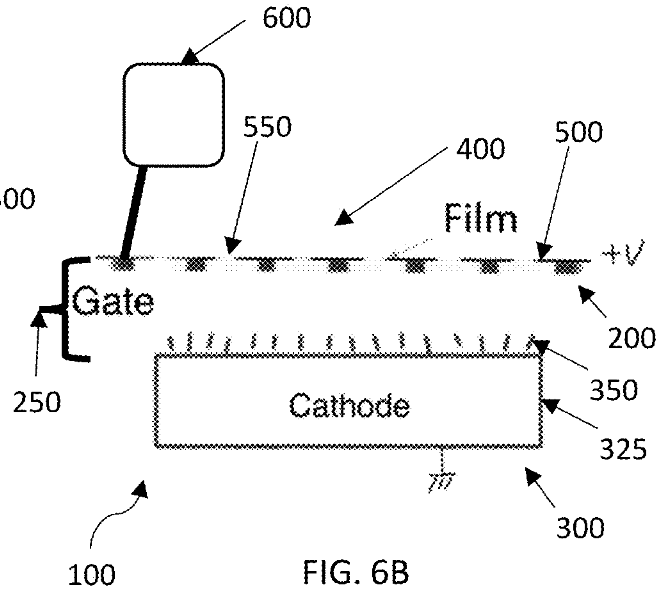
Figure 7:
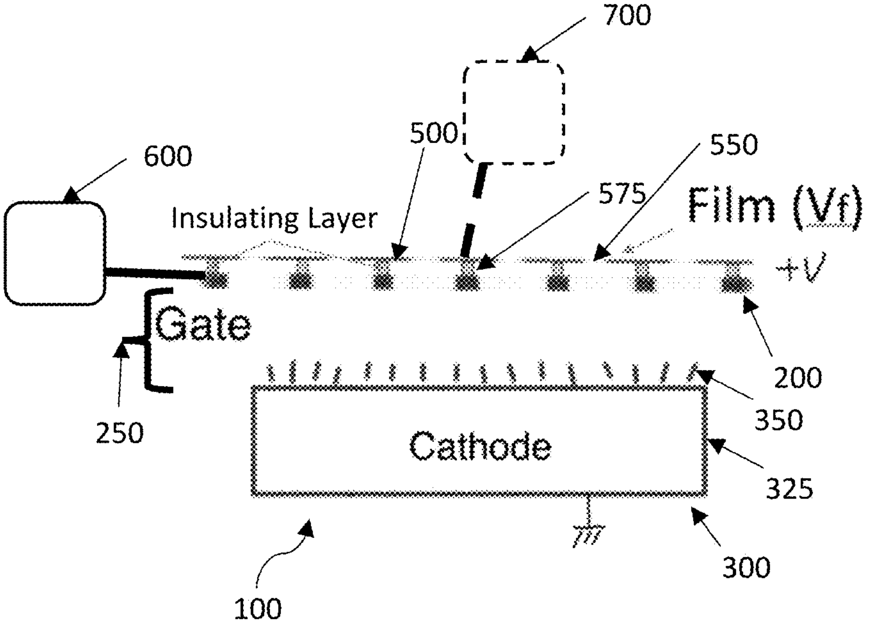

Having thus described the disclosure in general terms, reference will now be made to the accompanying drawings, which are not necessarily drawn to scale, and wherein:

FIG. 1 schematically illustrates a prior art example of a field emission cathode device;

FIG. 2A schematically illustrates a prior art example of a gate electrode for a field emission cathode device, with the gate electrode having multiple linear bars in a grill-like structure;

FIG. 2B schematically illustrates a prior art example of a gate electrode for a field emission cathode device, with the gate electrode having a mesh-like structure;

FIG. 3 schematically illustrates a prior art example of a field emission cathode device, with a gate electrode having a relatively high open area, resulting in a nonuniform electric field within the gap about the cathode surface;

FIG. 4 schematically illustrates a prior art example of a field emission cathode device, with a gate electrode having a relatively low open area, resulting in a relatively uniform electric field within the gap about the cathode surface, but relatively low electron transmission rate;

FIGS. 5A and 5B schematically illustrates a film element engaged with a gate electrode having a relatively high open area, according to one aspect of a field emission cathode device of the present disclosure, resulting in a relatively uniform electric field within the gap about the cathode surface with a relatively high electron transmission rate;

FIGS. 6A and 6B schematically illustrates a film element engaged with a gate electrode having a relatively high open area, with the film element defining one or more openings in the open areas of the gate electrode, according to another aspect of a field emission cathode device of the present disclosure, resulting in a relatively uniform electric field within the gap about the cathode surface with a relatively high electron transmission rate; and FIG. 7 schematically illustrates a field emission cathode device according to another aspect of the present disclosure, including an insulator element disposed between the film element and the gate electrode to thermally and/or electrically insulate the film element from the gate electrode.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 5A, 5B, 6A, 6B, and 7 illustrate various aspects of a gate electrode 200 for a field emission cathode device 100 (see, e.g., FIG. 1). Such a field emission cathode device 100 generally includes a cathode 300 comprising a substrate 325 (usually comprised of a metal or other conducting material such as stainless steel, tungsten, molybdenum, doped silicon), a layer of a field emission material 350 (e.g., a mixture of nanomaterials such as nanotubes, graphene, nanowires, etc.) disposed on the substrate 325, and, if necessary, an additional layer of an adhesion material (not shown) disposed between the substrate 325 and the field emission material 350.

A field emission cathode device/assembly 100 generally includes a field emission cathode 300 disposed in a spaced-apart relation to such a gate electrode 200 so as to define a gap 250 therebetween. An external gate voltage ($V_g$ or +V) is applied to the gate electrode 200, with the cathode 300 being connected to ground, such that the generated electric field extracts field emission electrons 400 from the field emission material 350 on the substrate 325 surface. Once the electrons 400 are emitted from the field emission material 350 on the substrate 325 surface, some of the electrons 400 will pass through the opening(s) or open area of the gate electrode 200, while other electrons 400 are absorbed by the gate electrode 200 (e.g., some emitted electrons will bombard the gate electrode).

The gate electrode 200, in some instances, is configured to include multiple linear bars in a grill-like structure (see, e.g., the plan view in FIG. 2A). In other instances, the gate electrode is configured as a mesh-like structure (see, e.g., the plan view in FIG. 2B). Moreover, the gate electrode 200 is generally comprised of a conductive material with a high melting temperature, such as, for example, tungsten, molybdenum, stainless steel, or doped silicon.

In operation, where a field emission cathode device has a physical opening portion of the gate electrode that is relatively low (see, e.g., FIG. 4—a dense mesh with less open area), more of the emitted electrons will be absorbed by the gate electrode, and the electron transmission rate is also relatively low (sometimes significantly). In contrast, if the physical opening portion of the gate electrode is relatively high (see, e.g., FIG. 3), the electric field within the gap and/or about the cathode surface becomes undesirably nonuniform. Since the emission of field emission electrons from the cathode surface is related to the characteristics of the triggering electric field, the nonuniform electric field, in turn, results in a nonuniform electron field emission from the cathode surface, which is not desirable.

Aspects of the present disclosure thus provide a field emission cathode device 100 (see, e.g., FIGS. 5A and 5B), wherein the device 100 includes a cathode element 300 having a field emission material 350 on a surface of the substrate 325, and a gate electrode element 200 disposed in spaced-apart relation to the field emission material 350 of the cathode element 300 so as to define a gap 250 therebetween. The gate electrode element 200 includes a plurality of parallel grill members or a mesh structure laterally-extending between opposing anchored ends (see, e.g., FIGS. 2A and 2B). A film element 500 laterally co-extends and is engaged with the gate electrode element 200. In particular aspects, the film element 500 is arranged to allowed electrons 400 emitted from the field emission material 350 of the cathode element 300 to pass therethrough ("gate transmission"). In addition, the film element 500 is also arranged to cooperate with the gate electrode element 200 and the cathode element 300 to form a substantially uniform electric field within the gap 250 and about the field emission material 350 of the cathode element 300. In particular aspects, a gate voltage source 600 is electrically connected to the gate electrode element 200, with the cathode element 300 electrically connected to ground. In such instances, the gate voltage source 600 is arranged to interact between the gate electrode element 200 and the cathode element 300 to generate the electric field within the gap 250 for inducing the field emission material 350 to emit the electrons 400 therefrom toward the gate electrode element 200.

In some aspects, the gate electrode element 200, whether having the plurality of parallel grill members or the mesh structure, has an open area of at least about 75%. That is, for a given area of the gate electrode element 200, at least about 75% of that area is open space, with the parallel grill members or the mesh structure occupying the remaining area (e.g., no more than about 25%). The open area of at least about 75% allows for a relatively high gate transmission rate of the gate electrode element 200 (e.g., the relatively high open area provides more opportunity for more of the emitted electrons to pass therethrough instead of bombarding the parallel grill members or the mesh structure). In other aspects, the gate electrode element has an open area of more than 80%.

In some aspects, the film element 500 is comprised of a metal, conductive silicon nitride, or carbon. In instances where the film element 500 is comprised of a metal, the metal comprises beryllium, aluminum, gold, or combinations thereof. The film element 500 is a thin film having a thickness on the order of nanometers (e.g., less than about 50 nm). The material of the film element 500, as well as the thickness of that material 500, contribute to forming a film having a high electron transparency (e.g., an electron transmission rate approaching the electron transmission rate of open area). In addition, the electrically-conductive film element 500 contributes to the formation of a substantially or relatively more uniform electric field generated in the gap 250 and about the cathode surface (see, e.g., FIG. 5B). The combination of the relatively high electron transmission rate coupled with the substantially or relatively more uniform electric field thus addresses the aforementioned need for a field emission cathode device arranged to generate and exhibit a substantially uniform electric field at the cathode surface (e.g., from the field emission material 350) that increases the efficiency of field emission electron generation, while the implementation of the film element 500 potentially reduces ion bombardment of the cathode surface.

In some aspects, the conductive film element 500 can be, but is not required to be, a continuous sheet member (e.g., a continuous nonporous planar element). For example, as shown in FIGS. 6A and 6B, the film element 500 engaged with the gate electrode 200 structure includes and defines some openings 550, particularly associated with the open areas of the gate electrode element 200, in order to facilitate maintenance of a sufficient vacuum between the gate electrode element 200 and the cathode element 300. That is, as particularly shown in the example of FIG. 6A, the openings 550 are defined and disposed in the film element 500 so as to correspond with the open spaces between the parallel grill members or the open spaces within the mesh structure. Such an arrangement of the conductive film member 500 defining one or more openings 550 corresponding to the open areas of the gate electrode element 200 still facilitates the formation of a substantially uniform electric field in the gap 250 about the cathode surface, for example, as long as each of the one or more openings 550 is relatively small (e.g., <30%) of the corresponding open area of the gate electrode 200.

Other arrangements and aspects of a field emission cathode device are within the scope of the present disclosure. For example, in instances where the film element 500 is comprised of a conductive material having a high melting temperature (e.g., silicon nitride), the film element 500 is arranged to directly engage (e.g., be in direct thermal/electrical contact with) the gate electrode element 200 (see, e.g., FIGS. 5A, 5B, 6A, 6B). In another example, in instances where the film element 500 is comprised of a conductive material having a low melting temperature (e.g., beryllium), the film element 500 and the gate electrode element 200 are arranged to include an insulator element 575 disposed therebetween to thermally insulate the film element 500 from the gate electrode element 200 (see, e.g., FIG. 7—to protect the film element from high temperatures in operation due to electron bombardment of the structure of the gate electrode element).

In some aspects, the insulator element 575 is also arranged to electrically insulate the film element 500 from the gate electrode element 200. In such instances, a film voltage source 700 ($V_f$) is optionally electrically connected to the film element 500, with the cathode element 300 electrically connected to ground (see, e.g., FIG. 7). The film voltage source 700 ($V_f$) is thus arranged to interact with the gate electrode element 200 (electrically connected to the gate voltage source 600 ($V_g$)) and the cathode element 300 (electrically connected to ground) to generate the electric field within the gap 250 with the desirable characteristics (e.g., substantially uniform electric field providing a substantially uniform electron emission from the cathode surface), as disclosed herein.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A field emission cathode device, comprising:

a cathode element having a field emission surface;

a gate electrode element disposed in spaced-apart relation to the field emission surface of the cathode element so as to define a gap therebetween, the gate electrode element having a plurality of parallel grill members or a mesh structure laterally-extending between opposing anchored ends, the grill members or the mesh structure defining one or more open spaces; and a film element laterally co-extending and engaged with the gate electrode element, the film element defining one or more openings extending therethrough and corresponding to the one or more open spaces of the gate electrode element, the one or more openings in the film element each having an area of less than an area of the corresponding open space defined by the gate electrode element, the film element engaged with the gate electrode element including the film element comprised of a conductive material and the film element being arranged to directly engage the gate electrode element, the film element thereby being arranged to allow electrons emitted from the field emission surface of the cathode element to pass therethrough, and to cooperate with the gate electrode element and the cathode element to form a substantially uniform electric field within the gap and about the field emission surface.

2. The device of claim 1, comprising a gate voltage source electrically connected to the gate electrode element, with the cathode element electrically connected to ground, and arranged to interact therebetween to generate the electric field within the gap for inducing the field emission surface to emit the electrons therefrom toward the gate electrode element.

3. The device of claim 1, wherein the area of the open spaces of the plurality of parallel grill members or the mesh structure of the gate electrode element is at least about 75% of the gate electrode element.

4. The device of claim 1, wherein the film element is comprised of a metal, conductive silicon nitride, or carbon.

5. The device of claim 4, wherein the metal comprises beryllium, aluminum, gold, or combinations thereof.

6. The device of claim 1, wherein the film element is a thin film having a thickness of less than about 50 nm.

7. The device of claim 1, wherein the gate electrode element is comprised of a conductive material having a high melting temperature.

8. The device of claim 1, wherein the gate electrode element is comprised of tungsten, molybdenum, stainless steel, doped silicon, or combinations thereof.

9. The device of claim 1, wherein the conductive material of the film element has a high melting temperature.

10. The device of claim 1, wherein the conductive material of the film element has a low melting temperature, and wherein the film element and the gate electrode element are arranged to include an insulator element disposed therebetween to thermally insulate the film element from the gate electrode element.

11. The device of claim 10, wherein the insulator element is arranged to electrically insulate the film element from the gate electrode element.

12. The device of claim 11, comprising a film voltage source electrically connected to the film element, with the cathode element electrically connected to ground, and arranged to interact with the gate electrode element and the cathode element to generate the electric field within the gap.

13. A method of forming a field emission cathode device, comprising:

disposing a gate electrode element in spaced-apart relation to a field emission surface of a cathode element so as to define a gap therebetween, the gate electrode element having a plurality of parallel grill members or a mesh structure laterally-extending between opposing anchored ends, the grill members or the mesh structure defining one or more open spaces; and engaging a film element with the gate electrode element, the film element laterally co-extending with the gate electrode element and defining one or more openings extending therethrough, such that the one or more openings correspond to the one or more open spaces of the gate electrode element, the one or more openings in the film element each having an area of less than an area of the corresponding open space defined by the gate electrode element, the film element engaged with the gate electrode element including the film element comprised of a conductive material and the film element being arranged to directly engage the gate electrode element, the film element thereby being arranged to allow electrons emitted from the field emission surface of the cathode element to pass therethrough, and to cooperate with the gate electrode element and the cathode element to form a substantially uniform electric field within the gap and about the field emission surface.

14. The method of claim 13, comprising electrically connecting a gate voltage source to the gate electrode element, with the cathode element electrically connected to ground, such that the gate voltage source is arranged to interact between the gate electrode element and the cathode element to generate the electric field within the gap for inducing the field emission surface to emit the electrons therefrom toward the gate electrode element.

15. The method of claim 13, wherein disposing the gate electrode element in spaced-apart relation to the field emission surface comprises disposing the gate electrode element, arranged such that the area of the open spaces of the plurality of parallel grill members or the mesh structure of the gate electrode element is at least about 75% of the gate electrode element, in spaced-apart relation to the field emission surface.

16. The method of claim 13, wherein engaging the film element with the gate electrode element comprises engaging the film element, comprised of a metal, conductive silicon nitride, or carbon, with the gate electrode element.

17. The method of claim 16, wherein engaging the film element with the gate electrode element comprises engaging the metal film element, comprised of beryllium, aluminum, gold, or combinations thereof, with the gate electrode element.

18. The method of claim 13, wherein engaging the film element with the gate electrode element comprises engaging the film element, comprising a thin film having a thickness of less than about 50 nm, with the gate electrode element.

19. The method of claim 13, wherein disposing the gate electrode element in spaced-apart relation to the field emission surface comprises disposing the gate electrode element, comprised of a conductive material having a high melting temperature, in spaced-apart relation to the field emission surface.

20. The method of claim 13, wherein disposing the gate electrode element in spaced-apart relation to the field emission surface comprises disposing the gate electrode element, comprised of tungsten, molybdenum, stainless steel, doped silicon, or combinations thereof, in spaced-apart relation to the field emission surface.

21. The method of claim 13, wherein engaging the film element with the gate electrode element comprises engaging the film element, comprised of the conductive material having a high melting temperature, with the gate electrode element.

22. The method of claim 13, wherein engaging the film element with the gate electrode element comprises engaging the film element, comprised of the conductive material having a low melting temperature, with the gate electrode element.

23. The method of claim 22, comprising disposing an insulator element between the film element and the gate electrode element to thermally insulate the film element from the gate electrode element.

24. The method of claim 23, wherein disposing the insulator element between the film element and the gate electrode element comprises disposing the insulator element, arranged to electrically insulate the film element from the gate electrode element, between the film element and the gate electrode element.

25. The method of claim 24, comprising electrically connecting a film voltage source to the film element, with the cathode element electrically connected to ground, such that the film voltage source is arranged to interact with the gate electrode element and the cathode element to generate the electric field within the gap.

* * * * *